United States Patent [19]
Hiesberger

[11] Patent Number: 6,088,982
[45] Date of Patent: Jul. 18, 2000

[54] SYSTEM FOR CONNECTING STRUCTURAL WALL MEMBERS

[76] Inventor: Michael A. Hiesberger, 701 W. 91st St., Kansas City, Mo. 64114

[21] Appl. No.: 08/929,990

[22] Filed: Sep. 15, 1997

Related U.S. Application Data

[63] Continuation-in-part of application No. 08/593,394, Jan. 29, 1996, abandoned.

[51] Int. Cl.[7] .................................. E06B 1/02; E04B 1/38
[52] U.S. Cl. ................................. 52/241; 52/712; 52/715; 52/731.1; 52/653.1; 403/231; 403/232.1
[58] Field of Search .............................. 52/241, 702, 712, 52/715, 731.5, 733.2, 737.2, 481.1, 653.1, 731.1; 403/230, 231, 232.1, 237, 403

[56] References Cited

U.S. PATENT DOCUMENTS

| | | | |
|---|---|---|---|
| 88,294 | 3/1869 | Holmes | 52/241 X |
| 497,383 | 5/1893 | Mela | 52/348 |
| 2,056,328 | 10/1936 | Price | 52/715 X |
| 2,058,386 | 10/1936 | Parsons | 52/241 |
| 2,172,358 | 9/1939 | Burson | 52/481.1 X |
| 2,235,761 | 3/1941 | Goldsmith | 52/241 X |
| 2,321,221 | 6/1943 | Linehan | 403/230 |
| 2,413,362 | 12/1946 | Maxwell et al. | 403/403 |
| 2,911,022 | 11/1959 | Brown | 403/230 X |
| 2,958,403 | 11/1960 | Robertson | 52/241 |
| 3,008,550 | 11/1961 | Miles et al. | 52/210 |
| 3,046,620 | 7/1962 | Tvorik et al. | 52/714 |
| 3,066,774 | 12/1962 | Dahme | 52/241 X |
| 3,188,696 | 6/1965 | Earhart | 52/241 |
| 4,330,971 | 5/1982 | Auberger | 52/712 X |
| 4,594,071 | 6/1986 | Hills | 52/702 X |
| 4,809,480 | 3/1989 | Hale | 52/737.2 X |
| 5,104,252 | 4/1992 | Colonias et al. | 52/702 X |
| 5,127,760 | 7/1992 | Brady | 403/230 |
| 5,685,121 | 11/1997 | DeFrancesco et al. | 52/241 X |

FOREIGN PATENT DOCUMENTS

| | | | |
|---|---|---|---|
| 2744523 | 4/1978 | Germany | 403/232.1 |
| 435226 | 9/1935 | United Kingdom | 403/232.1 |

OTHER PUBLICATIONS

Laidlaw, Angus M., "Steel Fasteners for D–I–Y Improvements", MI, pp. 102–104, Apr. 1982.

Maher, Arthur, "Engeineered Nailing Simplifies Framing", Popular Mechanics, pp. 137–140, Aug. 1964.

*Primary Examiner*—Laura A. Callo

[57] ABSTRACT

A metal connector connects perpendicular members of a structural wall to allow the structural wall to absorb a heaving floor. The connector is rigidly connected to a horizontal wall member, and is flexibly connected to a vertical wall member. The flexible connection is comprised of a rod or nail that passes through a vertical slot in the connector into the vertical wall member. In this way, when a heaving floor forces up the horizontal member, the vertical member is allowed to slide down the slot of the connector. The vertical member is rigidly attached to the connector in the other directions.

12 Claims, 6 Drawing Sheets

SYSTEM FOR CONNECTING STRUCTURAL WALL MEMBERS

This application is a continuation-in-part of application Ser. No. 08/593,394 filed Jan. 29, 1996, now abandoned.

BACKGROUND

Some floors are comprised of concrete footings and slabs. The footings are set in the ground, and the slabs rest on both the footings and the ground. Water tables and temperature changes cause the ground under the slab to expand and contract. This ground pressure causes the slab to move vertically. This movement of the slab is known as heaving. The footings remain relatively stable because they are set deeper in the ground. As a result, the slabs tends to heave more dramatically in their center away from any footings.

Some walls are comprised of vertical studs that are connected at the top and bottom by horizontal runners. Typically, the studs and runners are two inch by four inch wooden boards that are nailed together. The studs and runners are usually covered by a surface, such as dry wall or sheet rock.

When the slab heaves, walls that rest on the slab are pushed up. These are typically non-loadbearing walls. This action transmits a powerful amount of stress to the wall and to the overall structure. This situation is compounded by the fact that the stable footings do not experience heaving and tend to pull the structure back towards the ground. This creates even greater stress. This stress often manifests itself in cracked ceilings, uneven floors, and sticking doors.

Figure 1:
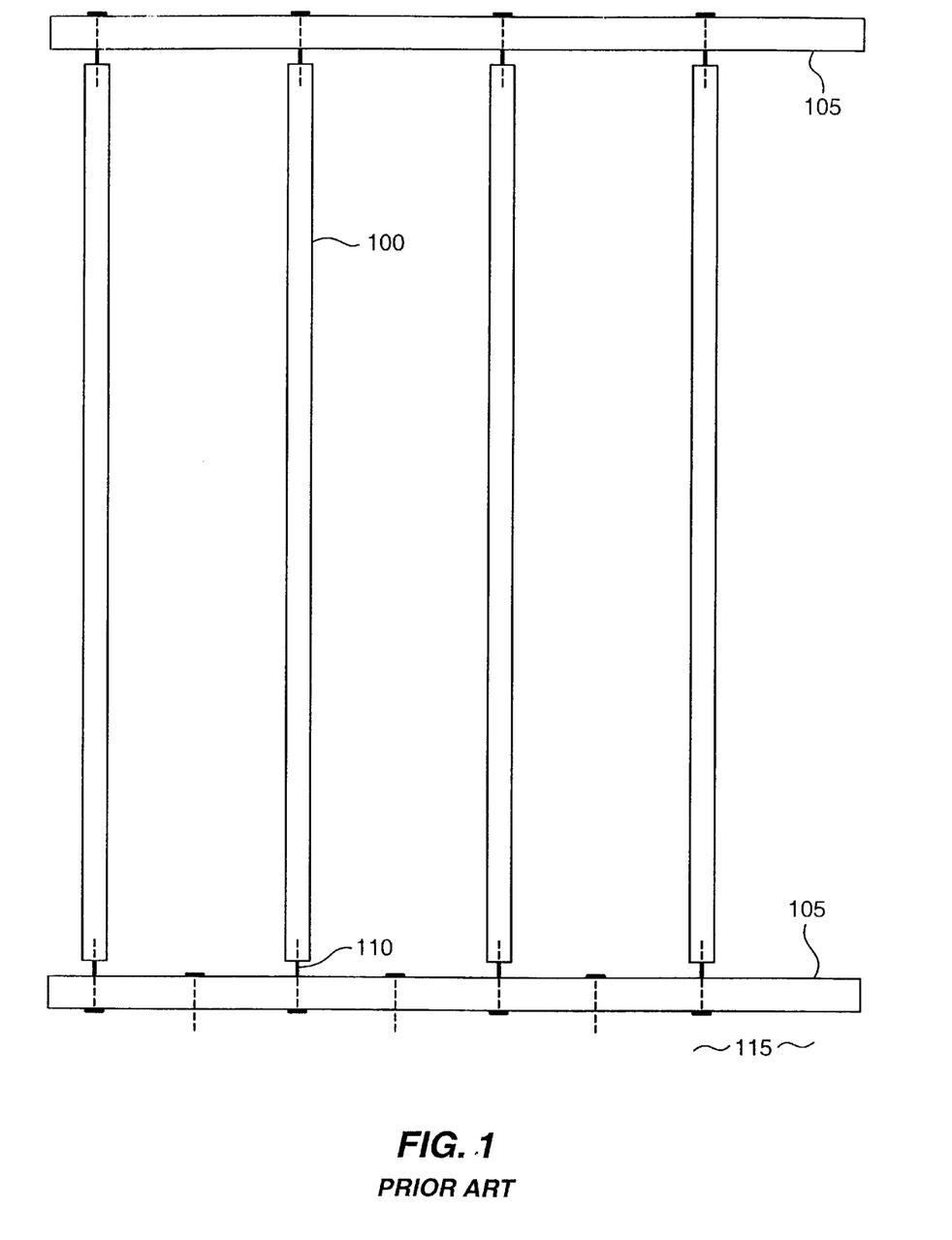
FIG. 1 depicts the prior art.

A current solution is to leave a gap between the studs and the runners of non-loadbearing walls. The stud is still nailed to the runner, but a gap is left between the surface of the stud and the surface of the runner so that the nails span the gap. When the wall is pushed up, the studs can simply slide up on the nails. If the wall recedes, the stud slides back down the nails. This situation is depicted in FIG. 1 which has been designated as prior art.

This solution is lacking. Aesthetically, it looks shoddy. More importantly, the nails spanning the gap are often bent or crushed as the wall is stressed. This weakens the wall since the stud is no longer properly secured to the runner. The gap can also cause the wall to hang from the top runner by nails. This is not an effectively secure connection for a hanging wall. A connector is needed to allow the studs some vertical movement in response to heaving, but to maintain a secure connection to the runners.

One known metal connector is an "L" bracket that has holes through one flange for a rigid connection with nails to a board, and the other flange has a slot allowing the other board to be flexably connected with a nail. The bracket is used to allow a roof to float above a wall that sags, however, this connector is deficient for use in the above context. Because it is only an "L" shape it does not restrict movement of the members in all the directions the invention does. The "L" bracket allows members to twist and bend in several directions. This connector is not designed to correct the problem solved by the invention.

SUMMARY

One version of the invention is a connector for structural wall members. The structural wall is comprised of a vertical member and a horizontal member that are connected in a perpendicular fashion. The connector comprises a first and second bottom flange, a first and second side flange, and a back flange. The bottom flanges each have a flat surface that is suitable to be connected to the horizontal member. The first side flange is comprised of a flat surface that extends in a perpendicular direction from an edge of the first bottom flange to configure the first bottom flange and the first side flange into an "L" shape. The surface of the first side flange has a vertical slot suitable to allow a rod to pass through the first side flange, connect to the vertical member, and slide in a vertical direction. The second side flange is comprised of a flat surface that extends in the perpendicular direction from an edge of the second bottom flange to configure the second bottom flange and the second side flange into a backwards "L" shape. The surface of the second side flange has a vertical slot suitable to allow a rod to pass through the second side flange, connect to the vertical member, and slide in the vertical direction. The back flange is comprised of a flat surface that extends in a perpendicular direction between a vertical edge of the first side flange and a vertical edge of the second side flange to configure the surface of the first side flange to be parallel to the surface of the second side flange and to configure the bottom flanges to extend away from each other. In a version of the invention, the back flange has an opening that is suitable to provide access to the vertical member through the back flange. In another version of the invention, one of the side flanges extends below the other side flange.

Another version of the invention is a structural wall frame for use in home construction. The wall frame comprises top and bottom horizontal runners, vertical studs, nails, and at least one metal connector. The vertical studs are positioned below the top runner and are evenly spaced from one another. The studs are perpendicular to the top runner. The bottom runner is positioned below the studs and is perpendicular to the studs. The metal connector is for use with the nails to connect a particular runner to a particular stud. The metal connector is comprised of two bottom flanges, two side flanges, and a back flange. The bottom flanges rest parallel against the runner and are positioned on opposite sides of the stud and are suitable to be nailed to the runner. The two side flanges extend in a perpendicular direction from the bottom flanges and rest parallel against opposite sides of the stud. The two side flanges are each suitable to be connected to the stud by one of the nails that passes through a vertical slot in the side flange into the stud allowing the nail in the stud to move up and down the slot in the vertical direction. The back flange extends between the side flanges and is suitable to rest parallel against the stud. In a version of the invention, the studs and the runners are two inch by four inch wooden boards. In another version of the invention, the metal connector connects the stud to the bottom runner and the invention further comprises at least other type of metal connector for use with the nails to rigidly connect the stud to the top runner.

DETAILED DESCRIPTION

As discussed in the Background section, FIG. 1 depicts a prior art solution to heaving floor slabs. A gap is left between stud 100 and runner 105. The gap is spanned by nails 110 that connect stud 100 to runner 105. If the wall is pushed up by floor slab 115, stud 100 and runner 105 can slide together on nails 110 until the gap is closed. When floor slab 115 recedes, stud 100 and runner 105 can separate again recreating the gap spanned by nails 110.

Figure 2:
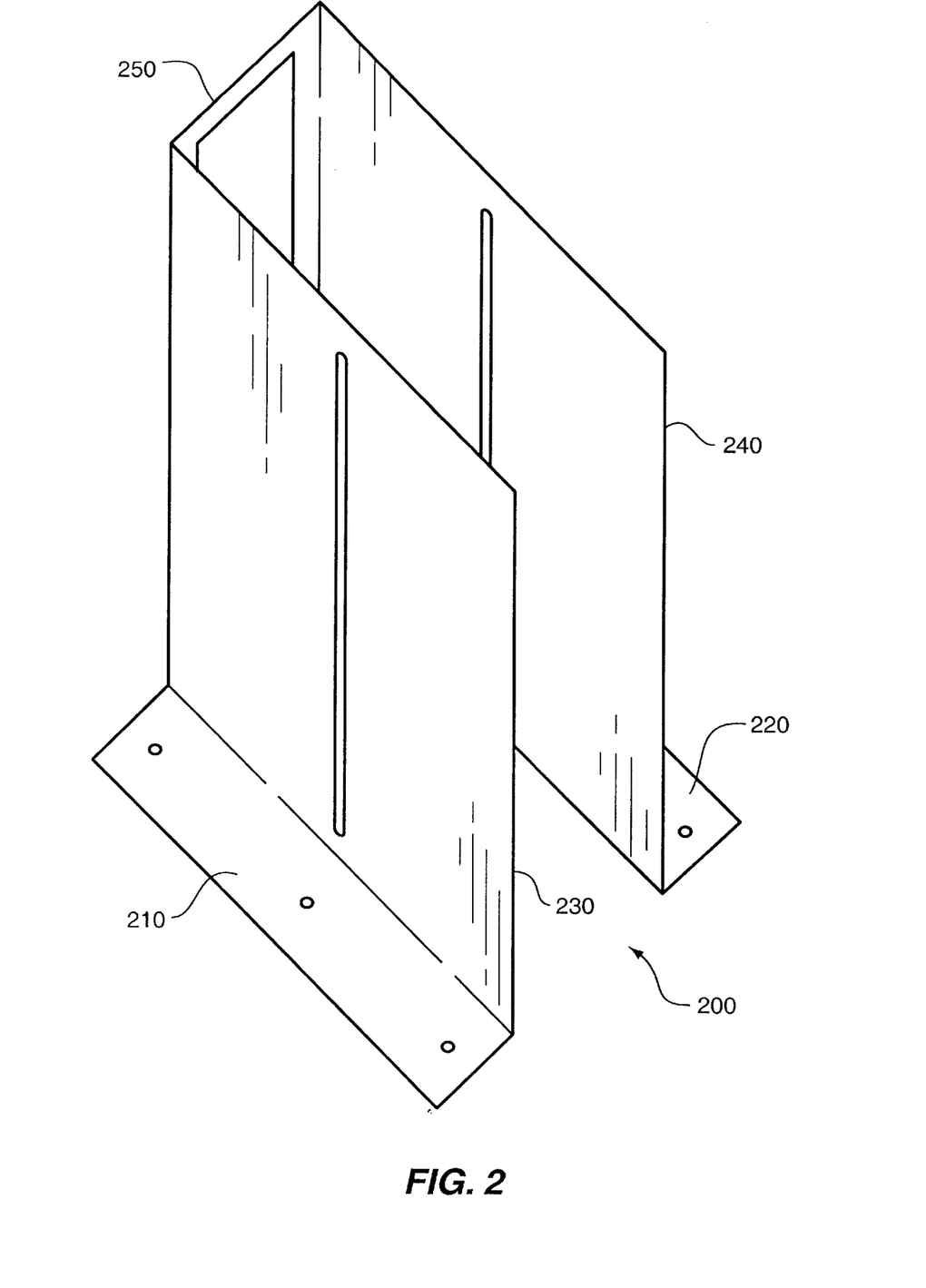
FIG. 2 depicts a version of a connector.

FIG. 2 depicts a version of the invention. Connector 200 is shown that is comprised of bottom flange 210, bottom flange 220, side flange 230, side flange 240, and back flange 250.

Bottom flange 210 would provide a rectangular surface for connection to a runner. Bottom flange 210 would have holes suitable for nails or screws to fasten connector 200 to a runner. Bottom flange 220 is similar to bottom flange 210, except that it is situated on the opposite side of connector 200. The size of bottom flanges 210 and 220 could vary based on the size of the structural wall members. For conventional two inch by four inch boards, bottom flanges 210 and 220 could be approximately one inch wide by three and one-half inches deep. Those skilled in the art will appreciate that other various sizes would also be suitable.

Side flange 230 extends upward from bottom flange 210. Side flange 230 would provide a rectangular surface for connection to the stud. Side flange 230 would have a vertical slot suitable to allow a nail or rod to pass through side flange 230. This nail or rod would secure connector 200 to the stud while allowing for some vertical movement up and down the slot. Side flange 240 is similar to side flange 230 except that it is situated on the opposite side of connector 200. The size of side flanges 230 and 240 could vary based on the size of the structural wall members. For conventional two inch by four inch boards, side flanges 230 and 240 would be approximately four inches high by three and one-half inches deep with the slot being three inches long. Those skilled in the art will appreciate that other various sizes would also be suitable.

Back flange 250 extends between side flanges 230 and 240. Back flange 250 would provide a rectangular surface to connect side flange 230 with side flange 240. Back flange 250 also supports one side of the stud and has an opening suitable to allow access to the stud once connector 200 is installed. For example, a floorboard may need to be nailed to the stud through the opening. The size of back flange 250 could vary based on the size of the structural wall members. For conventional two inch by four inch boards, back flange 250 could be approximately four inches high by one and one-half inches wide. Those skilled in the art will appreciate that other various sizes would also be suitable.

The vertical slot extends in the vertical direction for at least for at least two inches in some embodiments. In some embodiments, the back flange has an opening that is suitable to provide access to the vertical member through the back flange. The opening in the back flange could extend in the horizontal direction for at least one inch in some embodiments, or for at least two inches in other embodiments. The opening in the back flange could extend in the vertical direction for at least one inch in some embodiments, for at least two inches in some embodiments, or for at least three inches in other embodiments. These dimensions can be combined in various combinations.

Connector 200 could be fabricated in the same way and with the same materials as the metal connectors and joist hangers found in conventional home construction. Those skilled in the art will understand these fabrication techniques. Preferably, the connector would be fabricated from a composite sheet of metal that would be cut and bent into the shape and configuration described for FIG. 2. The connector would be the same general thickness as a common metal connector or joist hanger used in home construction. Those skilled in the art will be aware of other materials that could be substituted for metal.

Figure 3:
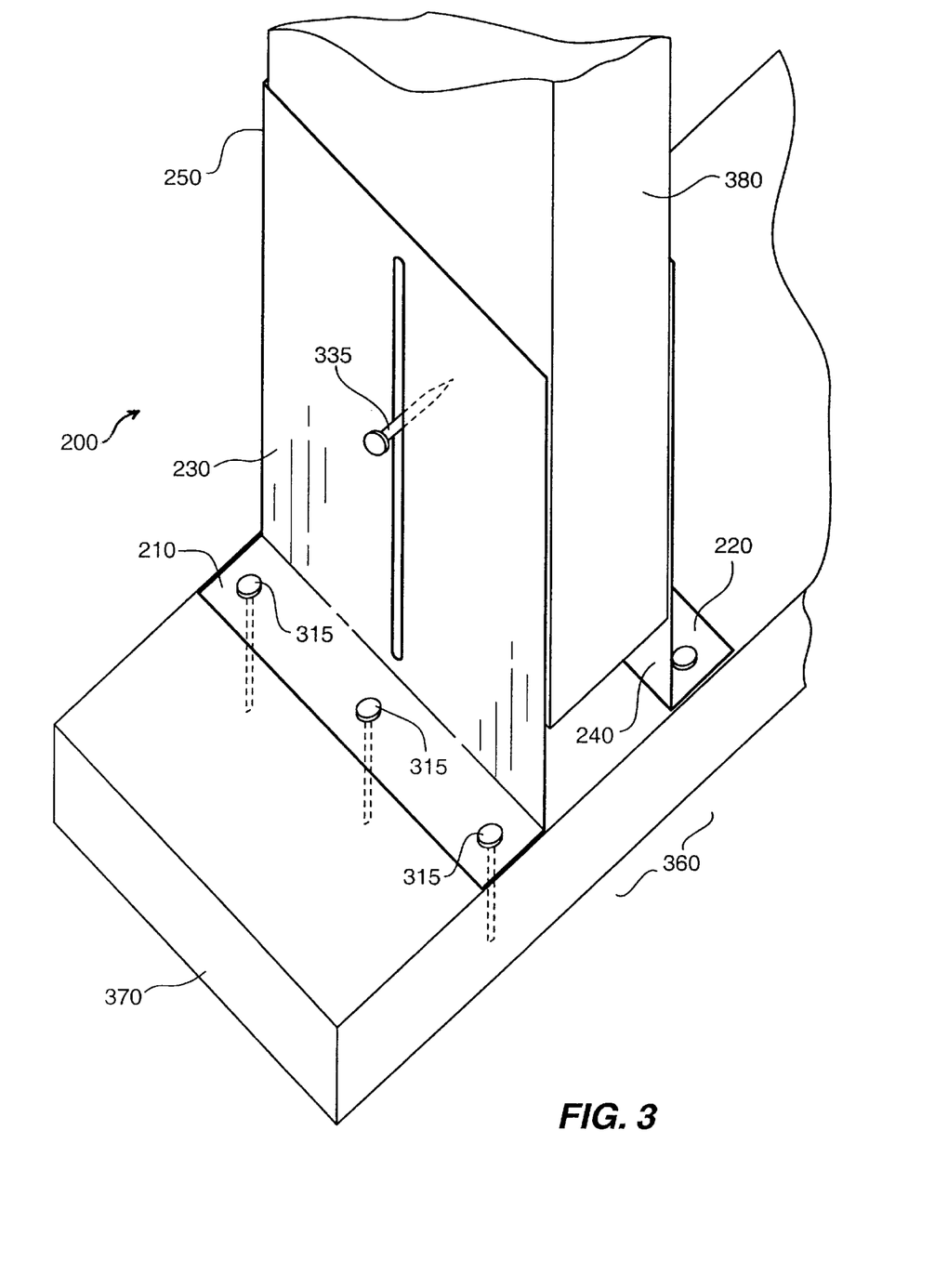
FIG. 3 depicts a version of an installed connector.

FIG. 3 depicts connector 200 that has been installed to form structural wall 300. As described connector 200 is comprised of bottom flanges 210 and 220, side flanges 230 and 240, and back flange 250. Also shown are floor 360, runner 370, and stud 380. Bottom flange 210 of connector 200 is connected to runner 370 by nails 315. The nails connecting bottom flange 220 to runner 370 are not shown. Side flange 230 of connector 200 is shown connected to stud 380 by nail 335. The nail connecting side flange 240 to stud 380 is not shown. Note that nail 335 is not completely driven into stud 380. Also note that there is a gap between the top of runner 370 and the bottom of stud 380.

When floor 360 heaves upward, it forces up runner 370 and connector 200. Stud 380 remains stationary since the slot in side flange 230 allows connector 200 to slide upward on nail 335 and stud 380 as the gap between runner 370 and stud 380 narrows. When floor 360 and runner 370 recede, connector 200 slides back down nail 335 and stud 380.

It can be seen that connector 200 allows runner 370 and stud 380 to remain flexibly connected in the vertical position to allow for a heaving floor, but that connector 200 securely connects runner 370 with stud 380 in each horizontal direction. This allows structural wall 300 to absorb a heaving floor, but remain relatively stable. The invention provides a distinct advantage over the use of nails to span the gap. Not only is it more secure than mere nails, it clearly looks more craftsmanlike. One prior art connector would be similar to a connector comprised only of flange 210 and flange 230. Clearly, such a connector would allow stud 380 to bend and twist in several directions and is not suited to in the present context.

Figure 4:
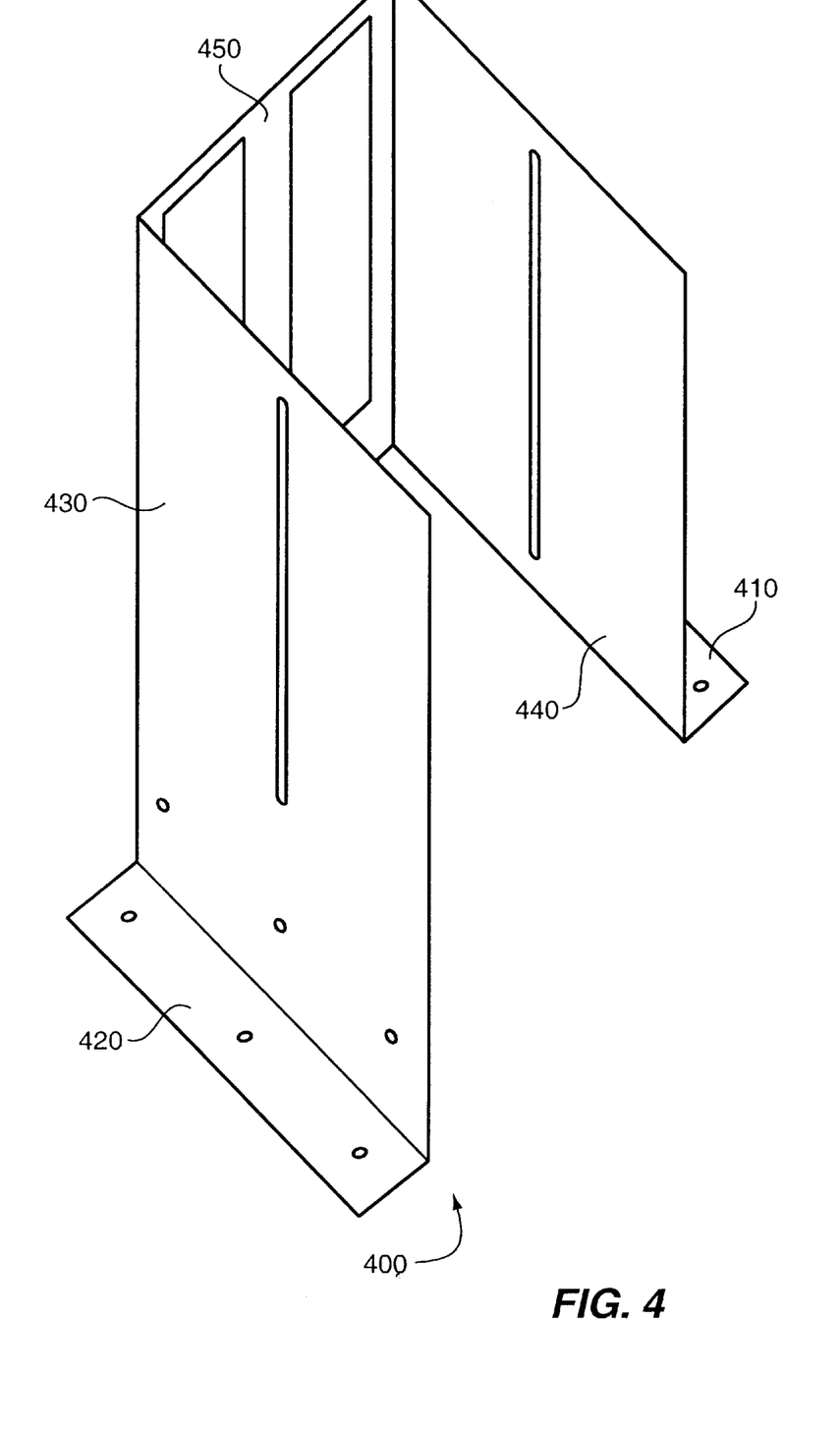
FIG. 4 depicts a version of a connector for use near a door.

FIG. 4 depicts a version of a connector for use near a door. Connector 400 is similar to connector 200 with differences described below. Connector 400 is comprised of bottom flanges 410 and 420, side flanges 430 and 440 and back flange 450. Bottom flanges 410 and 420 and side flange 440 is the same as similar elements for connector 200. Side flange 430 is different in that it extends down further than side flange 440 or back flange 450. If the runner is a two inch by four inch board, side flange 430 would extend one and one-half inches below side flange 440 and back flange 450. In addition, back flange 450 is wide enough to accommodate two studs. If the studs are two inch by four inch boards, back flange would be 3 inches wide. Those skilled in the art will appreciate that other various sizes would also be suitable.

Figure 5:
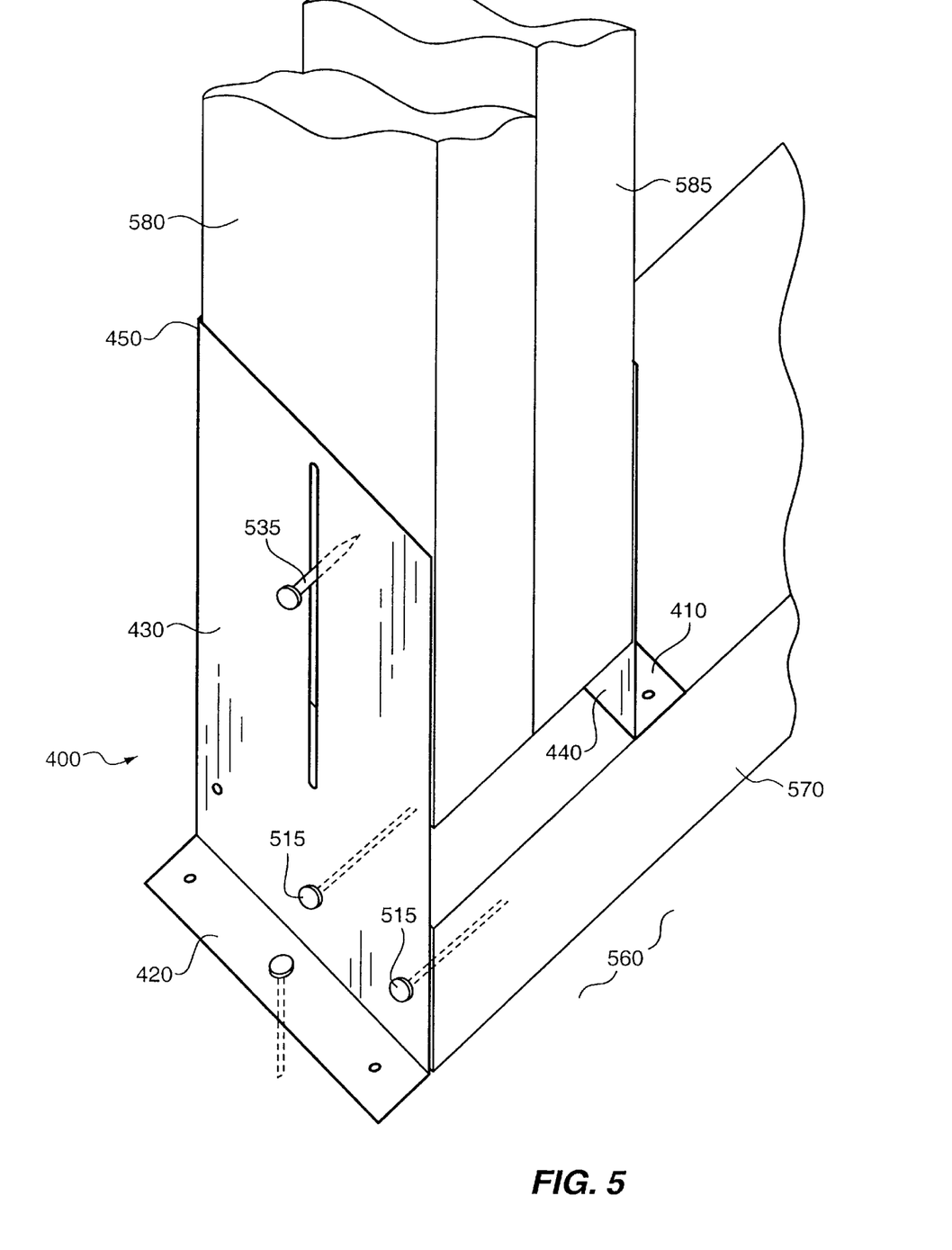
FIG. 5 depicts a version of an installed connector for use near a door.

FIG. 5 depicts a version of an installed connector for use near a door. Connector 400 is again shown comprised of bottom flanges 410 and 420, side flanges 430 and 440 and back flange 450. Also shown are floor 560, runner 570, stud 580, stud 585, and door 590. Connector 400 is connected to runner 570 by nails 515 and to floor 560 by nail 517 (the nails for bottom flange 420 are not shown). Connector 400 is connected to stud 580 by nail 535 (the nail for side flange 440 is not shown). It can be seen the connector 400 is installed and operates similar to connector 200 except that it accommodates double studs typical of a door frame, and it caps the runner where it ends at the door way.

Figure 6:
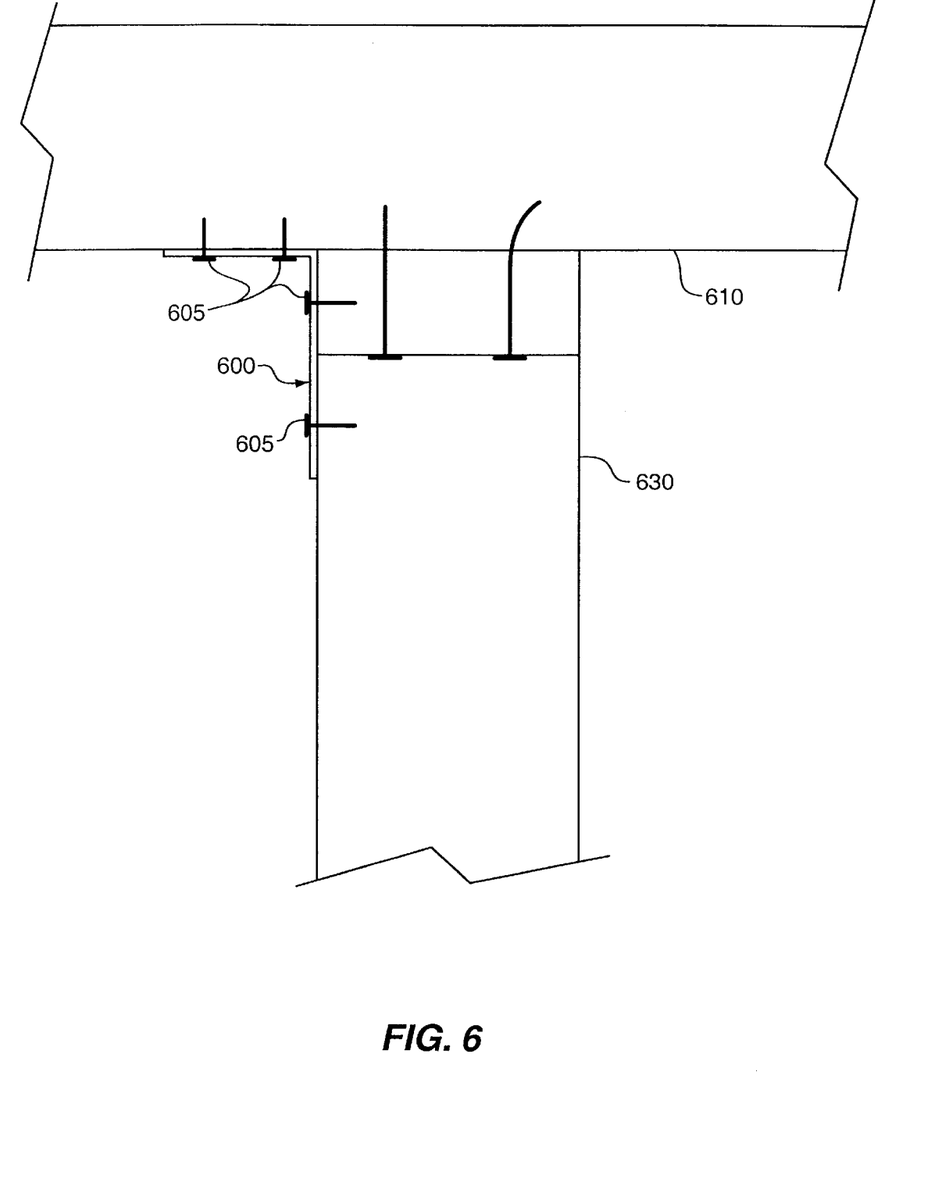
FIG. 6 depicts a version of another connector for use with one of the other connectors.

FIG. 6 depicts another connector suitable for use with one of the connectors described above. Shown is connector 600, joist 610 runner 620, and stud 630. Connector 600 could be a conventional "L" shaped bracket that could be connected by nails 605 to joist 610, runner 620, and/or stud 630 as appropriate. As discussed above, a gap is left between the stud and the runner to allow the wall to absorb a heaving floor. This gap causes the wall to effectively hang from the top. The connector of FIG. 6 is advantageous because it offsets the hanging effect by more securely fastening the structural wall to the joist. Those skilled in the art will appreciate other substitutes for the an "L" bracket that could facilitate the required rigid connection.

When combined, connectors 200 and 600 can be used to construct a structural wall that absorbs heaving floors while remaining more secure than previous structural walls designed to absorb a heaving floor. Often, those walls hung from the joist by nails only. By absorbing a heaving floor, the invention allows the entire structure to remain more sturdy and aesthetically pleasing.

Those skilled in the art will appreciate variations that could be made to the specific embodiments listed above without departing from the scope of the invention. As such, the invention should not be limited to the specific embodiments described above, but only restricted to the following claims.

I claim:

1. A structural wall frame for use in home construction that comprises;
    a top horizontal runner;
    a plurality of vertical studs that are positioned below the top runner and are evenly spaced from one another, wherein the studs are perpendicular to the top runner;
    a bottom horizontal runner that is positioned below the studs and is perpendicular to the studs;
    a plurality of nails connected to the studs and the runners; and
    at least one metal connector for use with a portion of the nails to connect one of the runners to one of the studs, wherein the metal connector is comprised of two bottom flanges that rest parallel against the runner and are positioned on opposite sides of the stud and that are nailed to the runner, two side flanges that extend in a perpendicular direction from the bottom flanges and rest parallel against opposite sides of the stud and that are each connected to the stud by one of the nails that passes through a vertical slot in the side flange into the stud allowing the nail in the stud to move up and down the slot in the vertical direction wherein the one nail is only partially driven into the stud, and a back flange that extends between the side flanges and rests parallel against the stud.

2. The wall frame of claim 1 wherein the studs and the runners are two inch by four inch wooden boards.

3. The wall frame of claim 1 wherein the metal connector connects the stud to the bottom runner and further comprising at least other type of metal connector for use with a portion of the nails to rigidly connect the stud to the top runner.

4. A connector for structural wall members wherein the structural wall is comprised of a vertical member and a horizontal member that are connected in a perpendicular fashion, wherein the connector comprises:
    a first bottom flange that is comprised of a flat surface that is suitable to be connected to the horizontal member;
    a first side flange that is comprised of a flat surface that extends in a perpendicular direction from an edge of the first bottom flange to configure the first bottom flange and the first side flange into an "L" shape, wherein the surface of the first side flange has a vertical slot suitable to allow a rod to pass through the first side flange, connect to the vertical member, and slide in a vertical direction for a distance of at least two inches;
    a second bottom flange that is comprised of a flat surface that is suitable to be connected to the horizontal member;
    a second side flange that is comprised of a flat surface that extends in the perpendicular direction from an edge of the second bottom flange to configure the second bottom flange and the second side flange into a backwards "L" shape, wherein the surface of the second side flange has a vertical slot suitable to allow a rod to pass through the second side flange, connect to the vertical member, and slide in the vertical direction for a distance of at least two inches; and
    a back flange comprised of a flat surface that extends in a perpendicular direction between a vertical edge of the first side flange and a vertical edge of the second side flange to configure the surface of the first side flange to be parallel to the surface of the second side flange and to configure the bottom flanges to extend away from each other.

5. The connector of claim 4 wherein the back flange has an opening that is suitable to provide access to the vertical member through the back flange.

6. The connector of claim 5 wherein the opening in the back flange extends at least one inch in the horizontal direction.

7. The connector of claim 5 wherein the opening in the back flange extends at least two inches in the horizontal direction.

8. The connector of claim 5 wherein the opening in the back flange extends at least one inch in the vertical direction.

9. The connector of claim 5 wherein the opening in the back flange extends at least two inches in the vertical direction.

10. The connector of claim 5 wherein the opening in the back flange extends at least three inches in the vertical direction.

11. A connector for structural wall members wherein the structural wall is comprised of a vertical member and a horizontal member that are connected in a perpendicular fashion, wherein the connector comprises:
    a first bottom flange that is comprised of a flat surface that is suitable to be connected to the horizontal member;
    a first side flange that is comprised of a flat surface that extends in a perpendicular direction from an edge of the first bottom flange to configure the first bottom flange and the first side flange into an "L" shape, wherein the surface of the first side flange has a vertical slot suitable to allow a rod to pass through the first side flange, connect to the vertical member, and slide in a vertical direction for a distance of at least two inches;
    a second bottom flange that is comprised of a flat surface that is suitable to be connected to the horizontal member;
    a second side flange that is comprised of a flat surface that extends in the perpendicular direction from an edge of the second bottom flange to configure the second bottom flange and the second side flange into a backwards "L" shape, wherein the surface of the second side flange has a vertical slot suitable to allow a rod to pass through the second side flange, connect to the vertical member, and slide in the vertical direction for a distance of at least two inches; and
    a back flange comprised of a flat surface that extends in a perpendicular direction between a vertical edge of the first side flange and a vertical edge of the second side flange to configure the surface of the first side flange to be parallel to the surface of the second side flange and to configure the bottom flanges to extend away from each other wherein the back flange has an opening that extends for at least one inch in both the vertical and horizontal directions and that is suitable to provide access to the vertical member through the back flange.

12. A connector for structural wall members wherein the structural wall is comprised of a vertical member and a horizontal member that are connected in a perpendicular fashion, wherein the connector comprises:

a first bottom flange that is comprised of a flat surface that is suitable to be connected to the horizontal member;

a first side flange that is comprised of a flat surface that extends in a perpendicular direction from an edge of the first bottom flange to configure the first bottom flange and the first side flange into an "L" shape, wherein the surface of the first side flange has a vertical slot suitable to allow a rod to pass through the first side flange, connect to the vertical member, and slide in a vertical direction;

a second bottom flange that is comprised of a flat surface that is suitable to be connected to the horizontal member;

a second side flange that is comprised of a flat surface that extends in the perpendicular direction from an edge of the second bottom flange to configure the second bottom flange and the second side flange into a backwards "L" shape, wherein the surface of the second side flange has a vertical slot suitable to allow a rod to pass through the second side flange, connect to the vertical member, and slide in the vertical direction for a distance of three inches; and a back flange comprised of a flat surface that extends in a perpendicular direction between a vertical edge of the first side flange and a vertical edge of the second side flange to configure the surface of the first side flange to be parallel to the surface of the second side flange and to configure the bottom flanges to extend away from each other wherein the back flange has an opening that is suitable to provide access to the vertical member through the back flange.

* * * * *